(12) United States Patent  
Beazell

(10) Patent No.: US 7,161,531 B1  
(45) Date of Patent: Jan. 9, 2007

(54) HIGH PERFORMANCE RADAR DISPLAY

(75) Inventor: Thomas G. Beazell, Charlottesville, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 302 days.

(21) Appl. No.: 10/969,444

(22) Filed: Oct. 20, 2004

Related U.S. Application Data

(60) Provisional application No. 60/517,308, filed on Nov. 4, 2003.

(51) Int. Cl.
- *G01S 7/04* (2006.01)
- *G01S 7/298* (2006.01)
- *G01S 13/00* (2006.01)
- *H04N 7/01* (2006.01)

(52) U.S. Cl. .............. 342/176; 342/175; 342/181; 342/185; 342/195; 342/197

(58) Field of Classification Search ........ 342/175–186, 342/195–197; 434/1–10  
See application file for complete search history.

(56) References Cited

U.S. PATENT DOCUMENTS

| | | | | |
|---|---|---|---|---|
| 3,412,398 A | * | 11/1968 | Schrader | 342/185 |
| 3,631,483 A | * | 12/1971 | Ruggles et al. | 342/185 |
| 4,412,220 A | * | 10/1983 | Aanstoot et al. | 342/185 |
| 4,660,043 A | * | 4/1987 | Lachaize et al. | 342/185 |
| 4,754,279 A | * | 6/1988 | Cribbs | 342/185 |
| 7,020,434 B1 | * | 3/2006 | Legan | 434/2 |

* cited by examiner

*Primary Examiner*—Bernarr E. Gregory  
(74) *Attorney, Agent, or Firm*—Seymour Levine

(57) ABSTRACT

A scan conversion is provided which allows the scan converter to work with data in its most convenient format in a radar memory. A displayable image is mirrored to a graphics memory simultaneously with the write portion of the radar memory of the scan conversion process. On every write to the radar memory, radar data is simultaneously converted to associated colors by indexing a color look-up table and writing the indexed color to the graphics memory. A simulated phosphor decay for the display is provided by decreasing the intensity of each pixel in the radar memory once each antenna scan and similarly decreasing the intensity of data in corresponding locations in the graphics memory to simulate the decay of a phosphor coated screen in a CRT display. The signals in the graphics memory are coupled to a display at a rate that simulates a display on a phosphor coated screen.

12 Claims, 3 Drawing Sheets

HIGH PERFORMANCE RADAR DISPLAY

The priority benefit of Provisional Application No. 60/517,308 filed Nov. 4, 2003 is claimed by this application.

BACKGROUND OF THE INVENTION

1. Field of the Invention

The invention pertains to the field of display systems, and more particularly to a PC platform display system simulating a long persistence phosphor display.

2. Description of the Prior Art

There is a need to emulate a long persistence phosphor to improve digital radar displays. The realization of this improvement presents several problems:

Efficient processing of data during scan conversion requires the data to be in a 4 to 8 bits per pixel and a 1024 by 1024 pixel bitmap format, while the display format must be in a 32 bit per pixel true color. Present host computers are not capable of converting a 1024 by 1024 bitmap to a 32 bit true color at a fast enough rate for a radar display.

The scan conversion requires read-modify-write cycles to memory at a very high rate that is not practicable over a PCI bus due to the high latency times on the data reads.

To make the phosphor decay process appear visually over the entire radar display area, the changing data must be updated to the display at a fast rate. The computer is not capable of transporting the bitmap data from the scan converter to the graphics board at the required data rate without placing an excessive burden on the CPU.

Previous radar displays with fast updates were custom designed to accomplish this task. They used dual ported video memory that allowed the scan converter to be working in the same memory that is being displayed on the screen by the graphics hardware. The synergy of scan converter memory and display memory was very efficient, and capable of emulating the phosphor decay, but not possible on the open architecture PC platforms now required.

Another system of the prior art utilized a hardware scan converter in a PC platform for radar overlay which generated a bitmap in local memory that was incrementally transferred to a display memory by a Direct Memory Access process. This scan converter solution is also not capable of emulating the phosphor decay now required.

SUMMARY OF THE INVENTION

In accordance with the present invention a scan conversion is provided which allows the scan converter to work with data in its most convenient format in a radar memory. A displayable image is mirrored to a graphics memory simultaneously with the write portion of the radar memory read-modify-write cycles of the scan conversion process. On every write to the radar memory, radar data is simultaneously converted to associated colors by indexing a color look-up table and writing the indexed color to the graphics memory over the PCI bus. A simulated phosphor decay for the display is provided by decreasing the intensity of each pixel in the radar memory once during each antenna scan and similarly decreasing the intensity of data in corresponding locations in the graphics memory to simulate the decay of a phosphor coated screen in a CRT display. The scan converter generates only write cycles for mirror image storage in the graphics memory on the PCI bus. Consequently, the scan converter never has to wait for the completion of a PCI bus read cycle.

An object of the invention is to provide a near real-time display.

A second object of the invention is to simulate a "Phosphor Decay".

A further object of the invention is to provide a scan converter that is independent of supplied graphics.

BRIEF DESCRIPTION OF THE DRAWINGS

The foregoing objects and advantages of the invention will become more fully understood from the Description of the Preferred Embodiments with reference to the drawings wherein.

DESCRIPTION OF THE PREFERRED EMBODIMENTS

Figure 1:
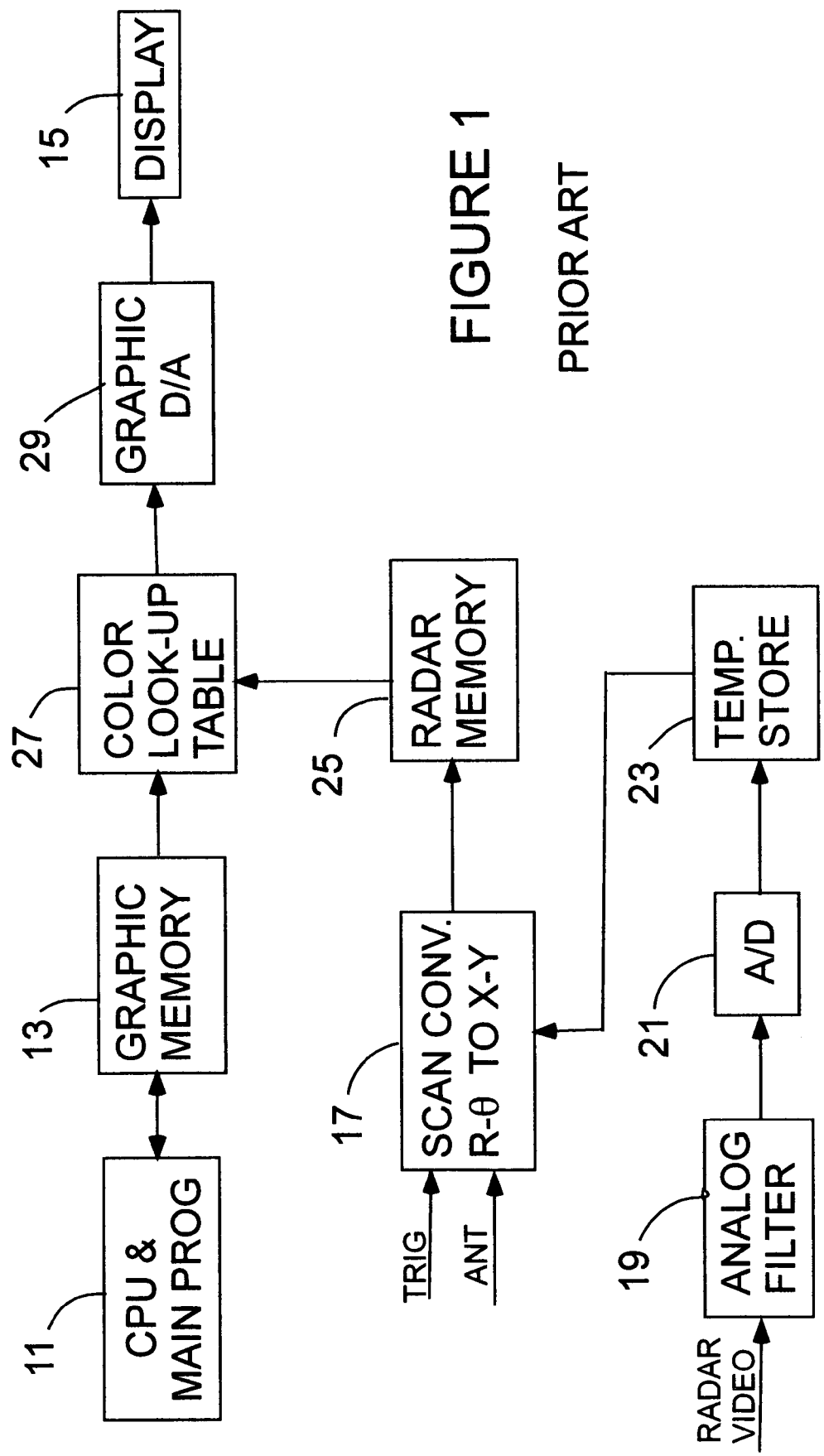
FIG. 1 is a block diagram of a scan converter and graphics display system of the prior art.

Refer now to FIG. 1. In a radar and graphics display system of the prior art a CPU and main program 11 generate graphics and text that are written to a 4 bit per pixel graphics memory 13. Graphics memory 13 is a dual port type that lets the CPU talk to memory at one port while the other port provides refresh data to a display monitor 15.

Radar video signals are coupled to a scan converter 17 as are a synchronizing trigger and an antenna pointing direction signal. This information is a rho-theta format. Rho, range, is determined by time from the trigger while theta, azimuth, is obtained from a signal coupled from an antenna drive system. Radar video is processed through an analog filtering circuit 19 and then converted to a digital data stream by an analog to digital converter (A/D) 21. This data stream of digital video is placed in a temporary store 23 for use by the scan converter 17. Temporary store 23 contains sample data for a single value of theta and rho values, for this theta value, over the entire range sweep. Scan converter 17 places each digital sample into the proper position in a radar memory 25. The X-Y nature of the radar memory has a direct correspondence to the X-Y location of pixels on the display 15. It does this by generating X and Y addresses for each rho value along a constant theta value in the temporary store 23. The data from the temporary store is then placed in the radar memory 25 at the generated X-Y addresses. The X and Y addresses of the rho values are calculated from the theta value of the current antenna position and a starting point in the radar memory. The process is repeated as the antenna rotates covering all the pixels in the radar memory. Radar memory 25 is a dual port type, identical to the Graphics memory 17. Scan converter 17 couples data to one port of the memory, while the display 15 is refreshed from the other port. Digital video is processed in the radar memory to produce fading of the image and decay of video tails. This fading and decay emulate the fading and decay inherent on a display screen coated with a long persistent phosphor.

Images stored in the graphics memory 13 and radar memory 25, which are updated at a rapid rate, are combined through a color mapping and pixel shifting circuit 27. Data resulting from this combination is timed to generate an X-Y raster and converted to the primary colors red, green, and blue (RGB) for display on the standard CRT monitor 15.

Figure 2:
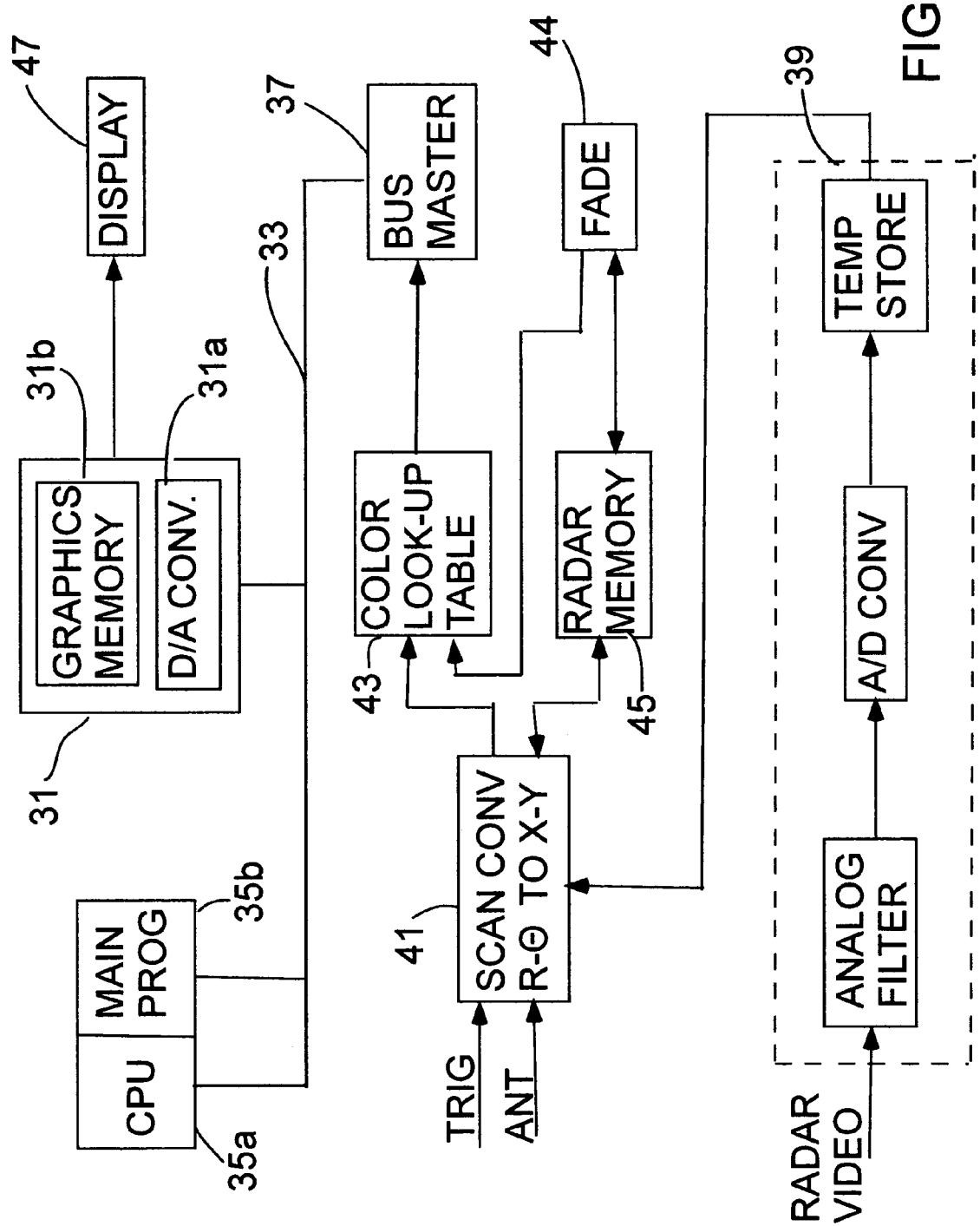
FIG. 2 is a block diagram of a preferred embodiment of the invention.

Refer now to FIG. 2, wherein a block diagram of a graphics display system utilizing the present invention is shown. A graphics generator 31 containing a digital-to-analog 31a and a high speed graphics memory 31b, which may have 32 megabytes of memory, is coupled to a bus 33, to which a central processor unit (CPU) 35a, a main program 35b, and a bus master 37, are also coupled. The high speed memory 31b may be accessed by the CPU 35 or the bus master 37 through the bus 33.

The CPU 35a and the main program 35b generate the graphics and text for the display and stores the data in a specified area of the high speed memory 31b. The main program 35b also controls the graphics generator 31 by passing commands and parameters over the bus 33. All digital video processing is performed in a radar processor 39. This data is coupled through a rho-theta to X-Y scan converter 41 to a color look up table 43 and a radar memory 45. The radar data exists in a plurality of predetermined states each of which is assigned a color which identifies the state of the radar on the display. Radar data from the scan converter 41 indexes the color look-up table 43 to select the color for each pixel that is representative of the radar data at that pixel. Color data selected in the color look-up table 43 are coupled through the bus master 37 and the bus 33 to the graphics memory 31b wherein it is combined with the graphics generated by the CPU 35a and the main program 35b.

Digital video data in a X-Y coordinate system from the scan converter 41 are coupled to and stored in the radar memory 45, wherein the radar data is stored in the designated X-Y locations. The radar data from the scan converter 41 is also coupled to the color look-up table 43 to index the table and select a color for display that is representative of the radar data at each X-Y coordinate. The representative color data is coupled from the look-up table 43 to the high speed memory 31b through the bus master 37 and bus 33 to be stored in the designated X-Y locations in the high speed memory 31b. All radar and graphics data stored in the high speed memory 31b are coupled to a display 47.

The entire system is under control of the main program 35b. The area in the high speed memory 31b which contains graphics and text and the area in the high speed memory 31b which contains the color representation of the radar image are combined to form a complete picture and placed in a display area of the high speed memory 31b to be displayed on a display 47. The coupling of the combination of graphics and radar data to the display 47 occurs at a high enough rate to make the radar image appear to be updating in real time thus achieving a performance in a non real time open system that is the equivalent of a real time system.

To emulate a radar display on a phosphor screen, radar data in the radar memory is modified by a fade processor 44 to produce data that simulates flash and fade of the data that emulates a decaying phosphor display. Radar signal amplitude at each X-Y location for an entire range sweep at all antenna azimuth positions within the angular range of the radar are entered into the radar memory 45. Entries for each range sweep represents the radar target returns, at the antenna position of the range sweep. These returns would appear as flashes on a phosphor screen of a CRT display. Amplitudes of all entries are decremented by the fade processor 44 once per each antenna scan. Each decrement lowers the amplitude of an entry by a preselected level. The fade processor 44 reads the value of an entry at a location in the radar memory 45, modifies its value, and writes the modified value back to same location in the radar memory 45. Fade processor 44 also couples the modified amplitude level to the color look-up table to select the color applicable for the modified level. The new color is then coupled to the graphics memory 31b and entered therein at the location corresponding to the location in the radar memory 45. Data in the graphics memory 45 is coupled through the digital-to-analog converter 31a to the display 47. In this manner the display 47 may be updated at a rapid rate while simulating the flash and decay properties of a phosphor display.

Figure 3:
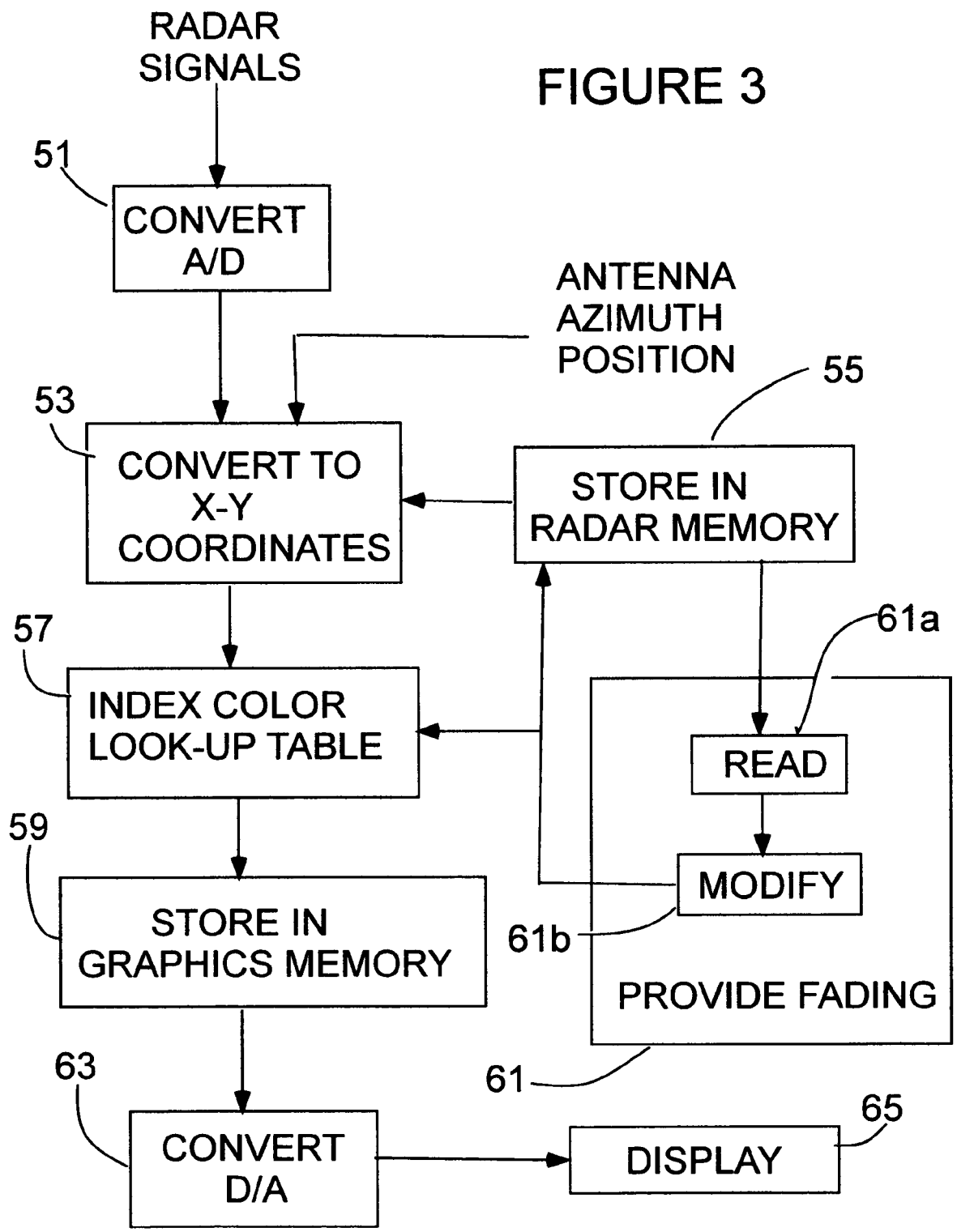
FIG. 3 is a flow chart of a preferred embodiment of the invention.

A flow chart of a preferred embodiment of the scan converter is shown in FIG. 3. Received analog radar signals are converted 51 into digital radar data. Range bin locations along at an antenna azimuth position are converted 53 from a rho-theta format to an X-Y format and the digital radar data for each range bin are stored 55 in X-Y locations of the respective range bins in a radar memory. The digitally converted radar signals index 57 a color table to select a color for each range bin that is characteristic of the data therein. Data representative of the selected colors are stored 59 in a graphics memory for display.

Entries in each range bin of the radar memory are modified once for each complete antenna scan to simulate fading 61 as would occur on a phosphor coated screen of a CRT display. Stored entries are read 61a and modified 61b to decrement the range bin amplitude by a preselected level and the range bin data is modified in accordance with the modified data. This modified data indexes the color look-up table to select a color representative of the modified data and the new color is stored 59 in the graphics memory in range bins respectively corresponding to the range bins in the radar memory. The stored data in the graphics memory are coupled to a digital-to-analog converter 63 to provide analog signals at a specified rate for a display 65 that emulates the display on a phosphor coated screen of a CRT display.

While the invention has been described in its preferred embodiments, it is to be understood that the words which have been used are words of description rather than of limitation. Thus the scope of the invention is determined by the appended claims and that changes may be made within the purview thereof without departure from the true scope and spirit of the invention in its broader aspects.

The invention claimed is:

1. A method for providing a radar display comprising the steps of:
   storing radar data in a first memory;
   providing a second memory wherein data that mirrors said radar data are stored, thereby storing mirrored radar data for display:
   lowering amplitudes of data stored in said first memory, thereby providing lowered amplitude data in each radar data X-Y coordinate location in said first memory;
   reducing intensities of said mirrored radar data stored in X-Y coordinate locations of said second memory in accordance with said lowered amplitude data in corresponding X-Y coordinate locations of said first memory.

2. A method in accordance with claim 1 wherein said providing step includes the steps of:
   indexing a color look-up table with said radar data to select colors for said mirrored radar data that are representative of said radar data; and
   storing said selected colors in said second memory locations respectively corresponding to locations in said first memory of said radar data.

3. A method in accordance with claim 2 wherein said radar data storing step includes the steps of:
   receiving analog radar signals in rho-theta coordinates;
   converting said analog radar signals in said rho-theta coordinates to digital radar data;

performing a coordinate conversion of said digital radar data from said rho-theta coordinates to X-Y coordinates; and locating said radar data in said first memory in accordance with respective X-Y coordinates.

4. A method in accordance with claim 3 wherein said lowering step includes the steps of:

reading data levels in all locations of said first memory;

decrementing each data level by a preselected increment to provide a faded data level for each location; and writing said faded data level into each location respectively.

5. A method in accordance with claim 4 wherein said reducing step includes the steps of:

indexing said color look-up table with faded data level at each location to select a color representative of said faded data level at that location; and storing said faded data level selected colors in said second memory locations respectively corresponding to locations in said first memory of said radar data.

6. A method in accordance with claim 5 further including the step of converting digital data stored in said second memory to analog signals for display.

7. A method in accordance with claim 1 wherein said radar data storing step includes the steps of:

receiving analog radar signals in rho-theta coordinates;

converting said analog radar signals to digital radar data;

performing a coordinate conversion of said radar data from said rho-theta coordinates to X-Y coordinates; and locating said radar data in said first memory in accordance with respective X-Y coordinates.

8. A method in accordance with claim 7 wherein said lowering step includes the steps of:

reading data levels in all locations of said first memory;

decrementing each data level by a preselected increment to provide a faded data level for each location; and writing said faded data level into each location respectively.

9. A method in accordance with claim 8 wherein said reducing step includes the steps of:

indexing said color look-up table with faded data level at each location to select a color representative of said faded data level at that location; and storing said faded data level selected colors in said second memory locations respectively corresponding to locations in said first memory of said radar data.

10. A method in accordance with claim 9 further including the step of converting digital data stored in said second memory to analog signals for display.

11. An apparatus for providing a radar display comprising:

an analog-to-digital converter coupled to receive analog radar signals and provide digital radar data;

a scan converter coupled to said analog-to-digital converter to convert said digital radar data from rho-theta coordinates to X-Y coordinates;

a first memory coupled to said scan converter wherein said digital radar data is stored at respective X-Y locations;

a color look-up table coupled to said scan converter and indexed by said digital radar data through said scan converter to provide colors representative of said radar data;

a second memory coupled to said color look-up table wherein said colors representative of radar data are stored in respective X-Y locations; and a fade processor coupled to said first memory to reduce radar data stored in said memory to faded radar data at each location therein, write said faded radar data into respective locations of said first memory, and index said look-up table with said faded radar data.

12. An apparatus in accordance with claim 11 further including a digital to analog converter coupled to said second memory to convert digital data to analog signals for display.

\* \* \* \* \*